Dec. 17, 1968 J. WEISS 3,416,502
INTERNAL COMBUSTION ENGINES
Filed April 22, 1965 7 Sheets-Sheet 1

INVENTOR.
JOSEPH WEISS
BY
ATTORNEY

Dec. 17, 1968  J. WEISS  3,416,502
INTERNAL COMBUSTION ENGINES
Filed April 22, 1965  7 Sheets-Sheet 3

INVENTOR.
JOSEPH WEISS
BY
ATTORNEY

Dec. 17, 1968   J. WEISS   3,416,502
INTERNAL COMBUSTION ENGINES
Filed April 22, 1965   7 Sheets-Sheet 5

INVENTOR.
JOSEPH WEISS
BY *[signature]*
ATTORNEY

Dec. 17, 1968     J. WEISS     3,416,502

INTERNAL COMBUSTION ENGINES

Filed April 22, 1965     7 Sheets-Sheet 7

INVENTOR.
JOSEPH WEISS

BY *[signature]*

ATTORNEY

United States Patent Office

3,416,502
Patented Dec. 17, 1968

3,416,502
INTERNAL COMBUSTION ENGINES
Joseph Weiss, 134 W. 93rd St., New York, N.Y. 10025
Filed Apr. 22, 1965, Ser. No. 450,124
13 Claims. (Cl. 123—75)

This invention relates to improvements to internal combustion engines which operate with fluid fuels such as kerosene, butane and gasoline.

The burning of fuel in an internal combustion engine depends on the type of fuel used, the volume and compression of the inducted intake into the cylinder. Diesel engines have a high rate of compression, approximately 500 lbs. p.s.i., being required to ignite and burn the fuel injected. The conventional diesel engine may have a compression ratio as high as 18–1. Thus a cylinder with a piston displacement of 81 cubic inches would have a combustion chamber volume of 4 cubic inches. In comparison the conventional gasoline engine having the same displacement with a 7.5–1 compression ratio has a clearance volume of approximately 11 cubic inches in which the burned and unburned gases of the cylinder's power stroke are trapped in the combustion chamber instead of being fully exhausted on the piston's exhaust stroke. This results in a contaminated mixture with the air-fuel intake of the piston's following intake stroke, causing poor and faulty combustion of the fuel. This is repeated in a continuous cycle.

The diesel engine which operates on a high temperature, generated by its high ratio of compression, to ignite the injected fuel, has great difficulty getting started in cold weather. The compressing of the cold air in a cold engines does not raise the temperature of the compressed air sufficiently to ignite the injected fuel. Various methods are used to assist in starting the engine such as the injecting of ether with the intake air, providing a heating element in the cylinder, etc. Increasing the compression ratio during starting intervals would do much to alleviate the problem, but present engine design places a limitation on compression ratio.

The above problems have long confronted both diesel and gasoline engine manufacturers, and inventors have over the years endeavored to find a practical solution to these problems, without success. The closest solution devised was the variable combustion chamber in which the combustion chamber clearance volume would vary in accord with the compression created by the piston on its compression stroke. This solution raised more problems for its design, operation, function and maintenance, than it solved and it has proven to be impractical for use in a conventional engine. Its use is solely limited for research purposes only.

Basically my invention is the proportioning of the induced intake for combustion after it has entered the engine's cylinder, and during the compression stroke of the piston. This makes possible higher compression pressures with a positive means of varying the compression pressure as desired in both stratified-charge and intake air throttled engines. In conventional engines where proportioning of air for combustion is restricted before it enters the cylinder, a high vacuum is created in the cylinder causing oil and oil fumes to be drawn into the cylinder which contaminates the inducted intake, resulting in poor combustion.

The object of my invention is to alleviate and erase these problems of the internal combustion engine.

A main object of the invention is to provide means whereby the inducted intake in an engine cylinder can be proportioned during the compression stroke of the engine's piston.

Another object is to increase engine power output with respect to its speed.

Another object is to enable the engine to use various kinds and grades of fuel by varying and adapting the compression pressure which will be the best for the fuel to be used.

Another object is to reduce to a minimum the amount of exhaust gases that will remain in the cylinder.

Another object is the allevaition of the drawing in of oil and oil fumes into the cylinder due to the high vacuum generated in the conventional engine.

Another object is to decrease fumes and pollution of the atmosphere, emitted by the engine due to faulty combustion.

Another object is to alleviate hard starting in cold weather.

Some of the advantages inherent in the invention are decreased oil consumption and oil contaimination, and increased fuel economy.

Other objects and advantages of the invention will become apparent from the following detailed description thereof.

To accomplish my objects, during slow speed operation of the engine, a cam operated valve in the engine cylinder is maintained open for most of the time the engine's piston is travelling on its compression stroke. The value is closed at a predetermined time during the compression stroke. The amount of inducted intake that is to be emitted from the cylinder during the compression stroke is done by varying the time interval the valve is maintained open. For the purpose of varying the timing of the valve there is provided a novel gearing mechanism which is interposed between the crankshaft gear and the camshaft which actuates the valve. There is also provided a means whereby the volume of emitted intake is controlled by restricting the flow of the emitted intake past the valve. This is accomplished by restricting means utilizing valve means which are variably controlled. The fuel is inserted into the engine cylinders in any one of the various methods known to the art.

To make my invention more clear the same is illustrated in the accompanying drawings in which similar reference characters denote corresponding parts and in which.

Figure 1:
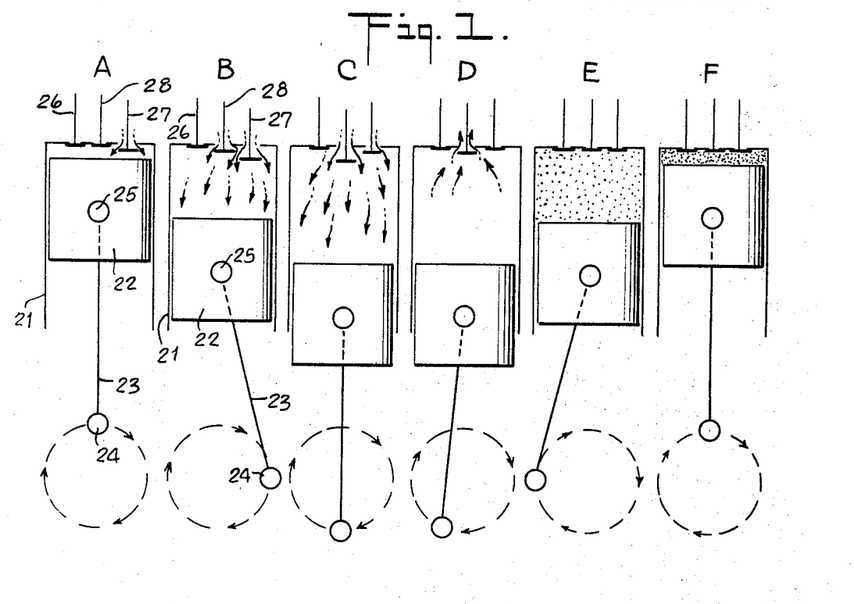
FIG. 1 is a view of a cylinder of a 4 cycle engine showing in sequence, FIGURES A, B, C, D, E, F, the piston and the valves and their relative positions to each other during the intake and compression stroke in an engine with my invention.

FIG. 1 is a view of a cylinder of a four cycle engine showing in sequence in the views designated A to F, the piston and the valves and their relative positions to each other during the intake and compression stroke of the piston. 21 denotes the engine cylinder with the conventional piston 22, connecting rod 23, crankshaft connecting rod journal 24, and wrist pin 25, 26 and 27 denotes the conventional exhaust and intake valves, respectively, both of which operate in the well known conventional manner. 28 denotes a time variable relief valve which is actuated in a novel manner unlike that of valves 26 and 27.

The operation of the engine at moderate speed is as follows: In the sequence, FIG. A shows piston 22 at top dead center position and at the start of its intake stroke; valves 26 and 28 are closed, intake valve 27 is opened, and intake starts. In FIG. B piston 22 is at 90 degrees after top dead center and valve 27 is almost fully open, valve 28 is opening. In FIG. C piston 22 is at bottom dead center and starting on its compression stroke, valve 27 is closing and valve 28 is fully open. In FIG. D piston 22 is at 30 degrees after bottom dead center and valve 27 is fully closed and valve 28 is still open and any excessive inducted intake in the cylinder is being ejected from the cylinder through valve 28. In FIG. E piston 22 is at 90 degrees after bottom dead center and all valves are closed and compression of the inducted intake not emitted from the cylinder, is now taking place. In FIG. F piston 22 is at the end of its compression stroke, combustion is taking place, and at its top dead center will start on its power stroke.

To increase or decrease engine speed, the valve 28 is caused to close earlier or later respectively, thereby varying the volume of the inducted intake retained in the cylinder for combustion.

The operation of the engine as regards its power and exhaust strokes are the same as for a conventional engine with the following exception; the venting of the cylinder of its exhaust gases is more complete due to a combustion chamber which is smaller in cubic volume due to a higher compression ratio made possible by the variable timed valve.

Figures 2, 3:
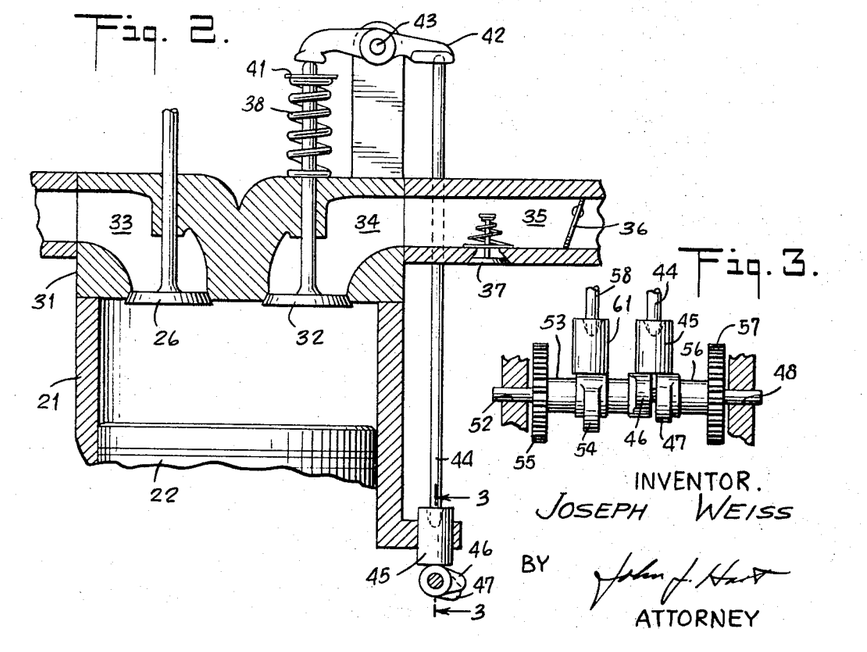
FIG. 2 is a fragmentary view of the top part of a cylinder and head showing valve structure, cam and manifold.
FIG. 3 is a sectional view taken along lines 3—3 of FIG. 2.

Referring to FIG. 2, the numeral 21 denotes the engine cylinder, 22 the piston, 31 the cylinder head and 26 the exhaust valve. There is also provided a single valve 32 which accomplishes the combined functions described and shown in FIG. 1 by valve 27 and valve 28. Further, in the showing of FIG. 2, 33 denotes the exhaust port, 34 the intake port, 35 the intake manifold, 36 denotes a conventional type of one way valve, and 37 denotes a conventional pressure relief safety valve. Valve 32 is actuated by cam means driven by the crankshaft. Cam lobes 46 and 47 act against valve lifter 45 to actuate valve 32. FIG. 3 shows in detail the manner in which valve 32 is able to perform the functions of both valve 27 and valve 28, as in FIG. 1. 48 denotes a shaft rigidly supported at 51 and 52. Rotatably mounted on shaft 48 is a conventional hollow camshaft 53 which has the conventional exhaust and intake cam lobes 54 and 46 respectively. Affixed to 53 is the conventional camshaft gear or sprocket 55 by which means it is driven from the crankshaft. Adjacent to camshaft 53 and rotatably mounted on shaft 48 is camshaft 56 having a cam lobe 47. Camshaft 56 is driven from the crankshaft through a variable timing drive mechanism which is in engagement with gear 57 which is rigidly affixed to the camshaft 56.

The operation of valve 32 by cam lobes 46 and 47 is as follows: At a certain predetermined speed of the engine camshafts 53 and 56 rotate in unison and their respective cam lobes 46 and 47 will be synchronous and in alignment. Thus the actuating of valve 32, will be the same as in a conventional engine. When the speed of the engine is decelerated to a low speed, the synchronous timed camshaft 56 is caused to rotate out of synchronism with camshaft 53, and consequently cam lobe 47 which is now out of alignment with cam lobe 46, as shown in FIG. 2, will retard the closing time of the valve 32.

When the engine is operating at a low speed or is idling, the emitted excessive inducted intake is forced back into the intake manifold 35 where it is retained by means of the one way valve 36, ready to be utilized in the engine's next intake stroke. In a multi-cylinder engine, the intake cycle of one or more cylinders overlap the intake cycle of another cylinder and the means 36 for retaining the emitted excess can be dispensed with, if so desired, as the overlapping cylinder or cylinders will draw in the emitted excess. For instance, in a four cylinder engine there is an intake stroke every 180 degrees of revolution of the crankshaft so that when one cylinder's piston is starting on its compression stroke, another cylinder's piston is starting on its intake stroke. In an eight cylinder engine the intake cycles are even more frequent and overlap closer. the valve 37 is optional and can be dispensed with. Where the engine utilizes an injector which sprays fuel for combustion directly inside the cylinder at the top of the piston's compression stroke, valves 36 and 37 are unnecessary as only air is being emitted from the cylinder.

Figures 4, 5, 6, 8:
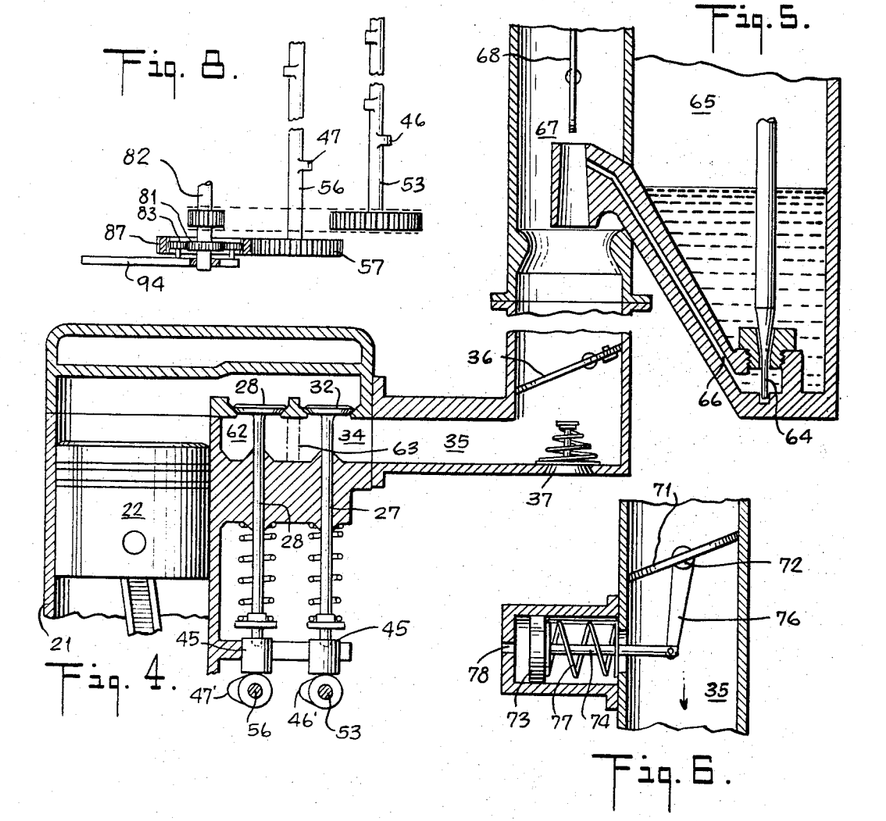
FIG. 4 is a vertical sectional view of an engine showing valve structure and manifold.
FIG. 5 is a sectional view through a portion of a fuel dispensing device.
FIG. 6 is a fragmentary sectional view of a one way valve and its actuating piston.
FIG. 8 is a portional view of a conventional camshaft with that of the variable timed driven camshaft and their operating means.

FIG. 4 shows one cylinder of a four cycle engine provided with two valves 27 and 28 which operate and function the same as the valves 27 and 28 in FIG. 1. Exhaust valve 26 is not herein shown. Valves 27 and 28 are actuated by separate camshafts 56 and 53 respectively. The opening and closing times of the valve 28 is arbitrary and depends on the engine's particular design. Valves 27 and 28 can have separate manifolds by separation of valve ports 62 and 34 as indicated by dotted lines at 63.

Referring to FIG. 5 an important improvement to engines in which the fuel is mixed with throttled intake air outside the cylinder, is now possible by dispensing with the butterfly throttle valve accelerator control which restricts free flow of air intake into the engine's cylinders. This restriction generates a vacuum which can be as high as 28 inches during deceleration and idling speeds of the engine. This high vacuum has a deteriorating effect on the engine and is a main cause of atmospheric pollution. FIG. 5 shows a fuel dispensing device, similar to a carburetor, which has no manifold throttle control valve. Liquid fuel or gas is metered, by an accelerator controlled metering pin 64 from the vessel or container 65 to the passageway 66 from where it is drawn into the cylinder by the intake air passing through the venturi 67. 68 denotes the conventional choke valve. Changes in engine speed and power can be made by enriching or leaning out the fuel to air ratio by means of the metering pin 64.

FIG. 6 is another modification of the one way valve 36 shown in FIGS. 2 and 5 and which is well known to those skilled in the art. This modification constitutes a butterfly valve 71 that is actuated by vacuum acting on piston 73 to move such butterfly valve open.

Figure 7:
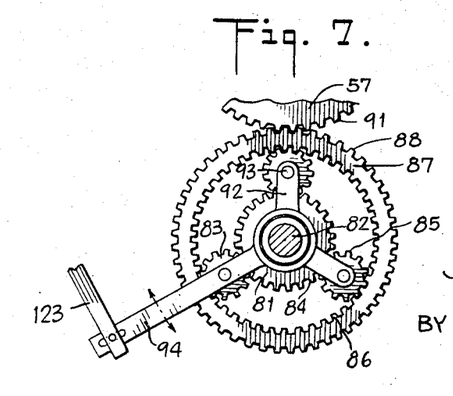
FIG. 7 is a fragmentary view of the variable timing drive mechanism of the invention showing its gear mechanism.

Referring now to FIG. 7 which is the variable timing drive mechanism for varying the timing of valve 28 shown in FIGS. 1 and 4 and that of valve 32 shown in FIG. 2. FIG. 7 should be considered with FIG. 8 in connection with the construction of FIGS. 1 and 4, and should be considered with FIG. 3 in connection with the construction of FIG. 2. 82 denotes the crankshaft to which gear 81 is rigidly affixed. Gear 81 is in engagement with idler gears 83 through gear teeth 84 and 85 respectively. Gears 83 are also in engagement with gear teeth 86 of ring gear 87 which has on its outer periphery gear teeth 88 engaging with gear teeth 91 of a camshaft gear 57 corresponding to gear 57 in FIG. 3. Idler gears 83 are connected with each other by cage 92 and their pinions 93 which are rigidly affixed to cage 92. 94 denotes an arm or lever for regulating the positioning of cage 92 and therefore of the idler gears 83 with respect to their location about the periphery of gear 81. Rotation of crankshaft gear 81 is transmitted through idler gears 83 to ring gear 87. Rotation of ring gear 87 is transmitted to camshaft gear 57. When cage 92 is held in a certain fixed position, synchronism of the gear 81 with that of gear 57 is constant so that timed actuation of valves 28 in FIGS. 1 and 4 and valve 32 in FIG. 2 with respect to position 22 and gear 81 will always occur at the same time during their respective related positions of rotation and movement. Displacing cage 92 displaces the idler gears 83, thereby changing the synchronism between gears 81 and 87, and causing a change in the synchronized relationship of gear 57 with gear 81 to change the timing of the valves.

Figures 9, 10:
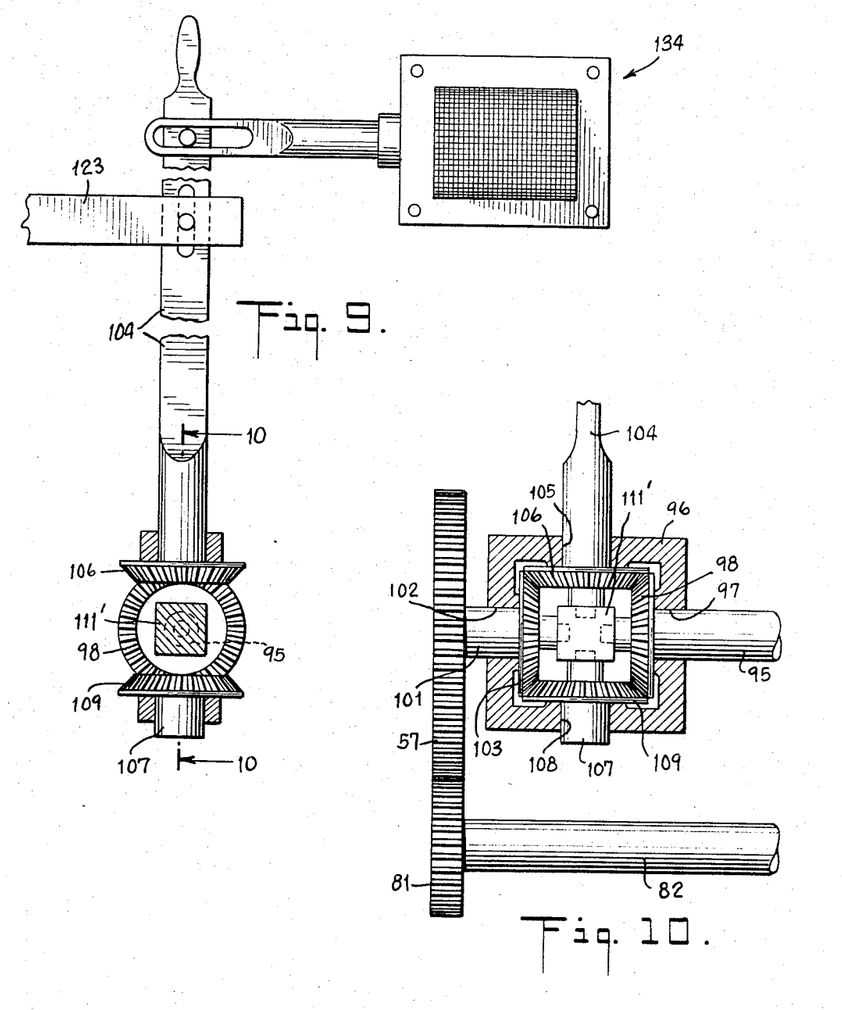
FIG. 9 is a fragmentary view of another modification of the variable timing drive mechanism.
FIG. 10 is a sectional view of the drive mechanism taken along vertical lines 10—10 of FIG. 9.

FIGS. 9 and 10 illustrate another modification of the variable timing drive mechanism shown in FIG. 7. In this modification there is interposed between the camshaft gear 57 and camshaft 95 a housing 96. Camshaft 95 enters into the housing, in which it is freely rotatable at 97, and rigidly affixed to such shaft 95 is a mitre gear 98. Gear 57 is rigidly affixed to shaft 101 which enters the housing at 102 and in which it is freely rotatable. Rigidly affixed to shaft 101 is mitre gear 103. A control arm shaft 104 corresponding to the control arm 94 of FIG. 7 is press fitted into the housing at 105. A mitre gear 100 is freely rotatable on shaft 104. Shaft 107 is press fitted in the housing at 108 and has freely rotatable thereon a mitre gear 109. 111' denotes the spacer block into which the reduced diameters of all the shafts are freely fitted. Drive is transmitted from gear 81 mounted on crankshaft 82, to camshaft 95, through gear 57 to mitre gear 103, and through mitre gears 106 and 109 to mitre gear 98 and camshaft 95. The mode of operation of this modification is controlled in a manner substantially the same as that of the construction shown in FIG. 7 and is accomplished by shifting the shaft 104 to regulate the position of the housing 96. The variable timing drive mechanism is adaptable for either manual and/or automatic control for varying the valve timing.

Figure 11:
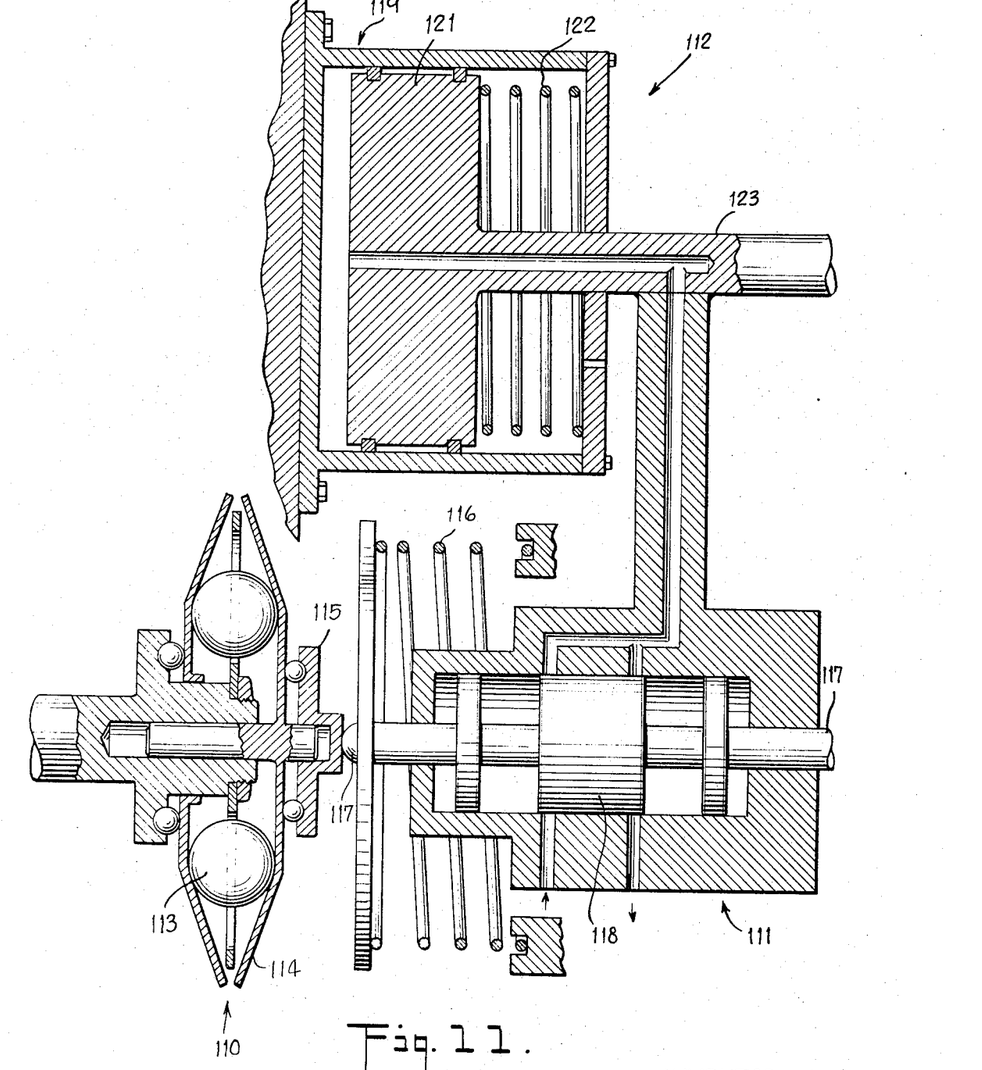
FIG. 11 is a sectional view showing the governor, hydraulic cylinder and shuttle valve.

FIG. 11 shows a centrifugal governor 110, hydraulic shuttle valve assembly 111, and hydraulic power cylinder and piston assembly 112, all of which are well known to those skilled in the art and by which the variable timing drive mechanism of FIGS. 7 and 10 may be automatically maintained in synchronism with the speed of the engine. As the speed of the engine increases, centrifugal forces cause the ball 113 to move outwardly, displacing the axially movable dished disc 114, and through the latter exerting pressure on the thrust bearing 115 and end of shaft 117 to overcome the force of the governor control spring 116. Axial movement of disc 114 to the right moves the valve spool 118 to the right allowing oil under pressure, from the engine or any other suitable source, to enter the power cylinder 119, thereby causing the movement of the hydraulic piston 121 and the piston rod 123 to the right, and through the latter the repositioning of the lever 94 or 104 of the timing drive mechanism shown in FIGS. 7 or 9, 10, respectively. The shuttle valve 111 is moved in unison with the piston rod 123 to which it is firmly attached. When the speed of the engine is constant, the valve spool 118 maintains a neutral position whereby no further oil can enter the hydraulic cylinder. A decrease in the engine's speed lessens the centrifugal forces acting on the control spring 116. This displaces the valve spool to the left, permitting oil from the hydraulic cylinder 119 to bleed off. As a consequence the hydraulic piston 121 will be moved to the left by its return spring 122, thereby repositioning the variable timing drive mechanism, through piston rod 123 and its associated lever 94 or 104.

Figures 12, 13, 14, 15:
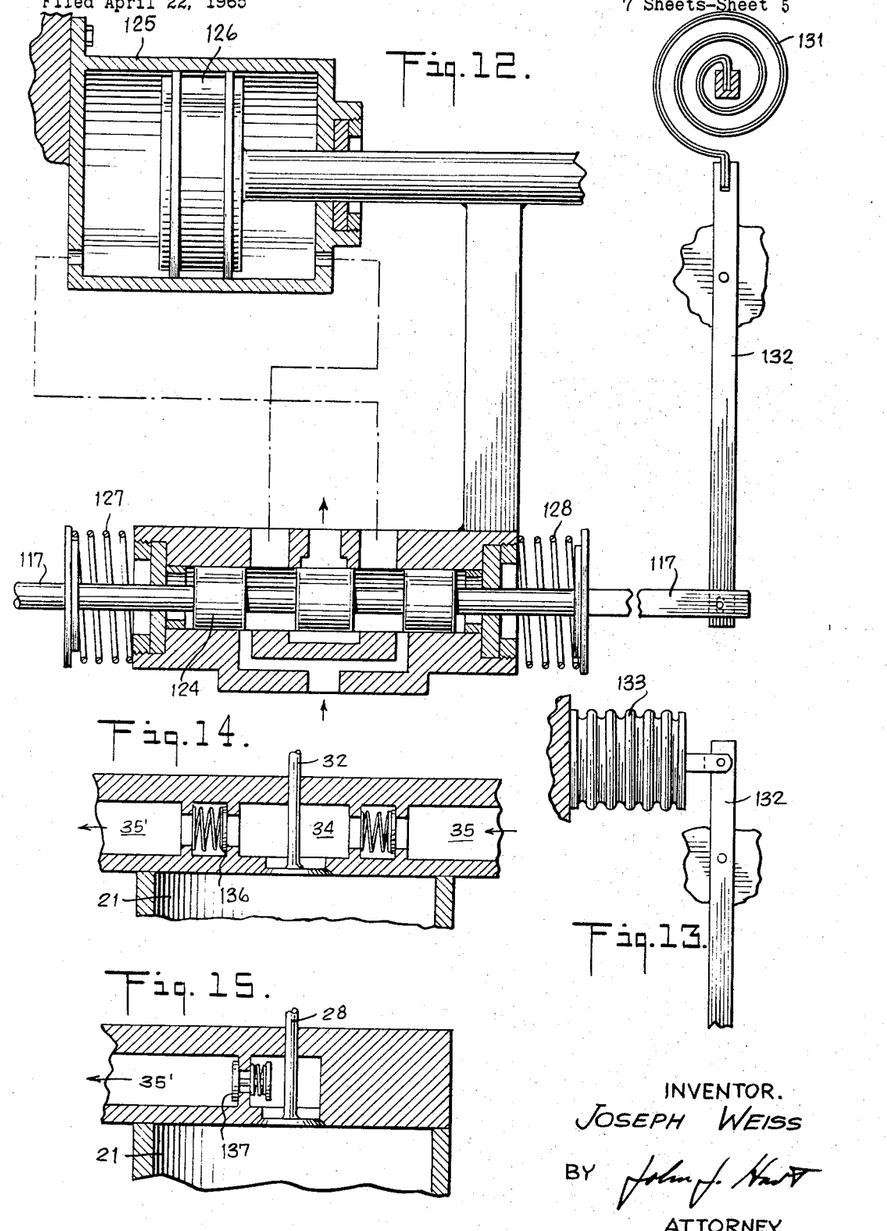
FIG. 12 is a sectional view of another modification of the hydraulic cylinder and shuttle valve shown in FIG. 11 and thermostatic control means.
FIG. 13 is a fragmentary view of barometer bellows.
FIG. 14 is a fragmentary view of a cylinder head and valves functional to the invention.
FIG. 15 is a fragmentary view of another modification of FIG. 14.

FIG. 12 is another modification of the hydraulic valve and hydraulic cylinder, also well known to the art. It includes a rod 117 connected to a governor in the manner shown in FIG. 11. When the shuttle valve spool 124 thereof, which corresponds to the spool 118 in FIG. 11, is in its center position oil under pressure enters the hydraulic cylinder 125 on both sides of the piston 126 to prevent and resist movement of the piston by external forces tending to displace it. Movement of the valve spool to the right directs oil under pressure to the left side of the cylinder, causing the hydraulic piston to move to the right, the fluid trapped in the right side of the cylinder being by-passed back to the reservoir. When actuation movement of the valve spool 124 to the right ceases, the valve spool centering springs 127 and 128 forces the valve spool back to its neutral position, and balanced forces on both sides of the hydraulic piston result. Acutation of the valve spool to the left results in action the same as that described for right side movement. 131 is a thermostatic control which may be employed automatically actuating the valve spool 124 by means of lever 132 during cold weather to increase the engine's compression volume by varying the drive mechanism.

FIG. 13 shows a barometer bellows 133 which may be employed for raising the compression ratio in high altitudes. A decrease in atmospheric pressure expands the bellows to actuate the valve spool lever 132. Another means which may be employed for automatically raising the compression ratio, is the electrical solenoid 134 shown in FIG. 9 which is, during the starting interval, energized to actuate the lever 104. Solenoid 134 can be placed so as to actuate lever 132 to actuate the variable timing drive mechanism by the hydraulic power cylinder.

FIG. 14 shows a combination valve 32 (as in FIG. 2), valve port 34, and intake manifold 35. 135 denotes a one way check valve which allows air to enter the cylinder from the manifold 35. 136 denotes a one way check valve that permits only air that is under pressure, in excess of that for which valve 136 had been set to open for, to exit from cylinder 21 open valve 32, and pass through port 34 and valve 136 to manifold 34'. The valve 136 is to insure a predetermined compression in the cylinder prior to the emission of any excess inducted intake.

FIG. 15 is a view similar to FIG. 14, and shows a valve 28, as in FIG. 1 and FIG. 4, and a pressure operated relief valve 137. Valve 28 is solely for the purpose of emitting inducted intake from the cylinder, and valve 137, as in the case of valve 136 of FIG. 14, is for the purpose of insuring a predetermined compression in the cylinder prior to the emission of any excess intake.

Figure 16:
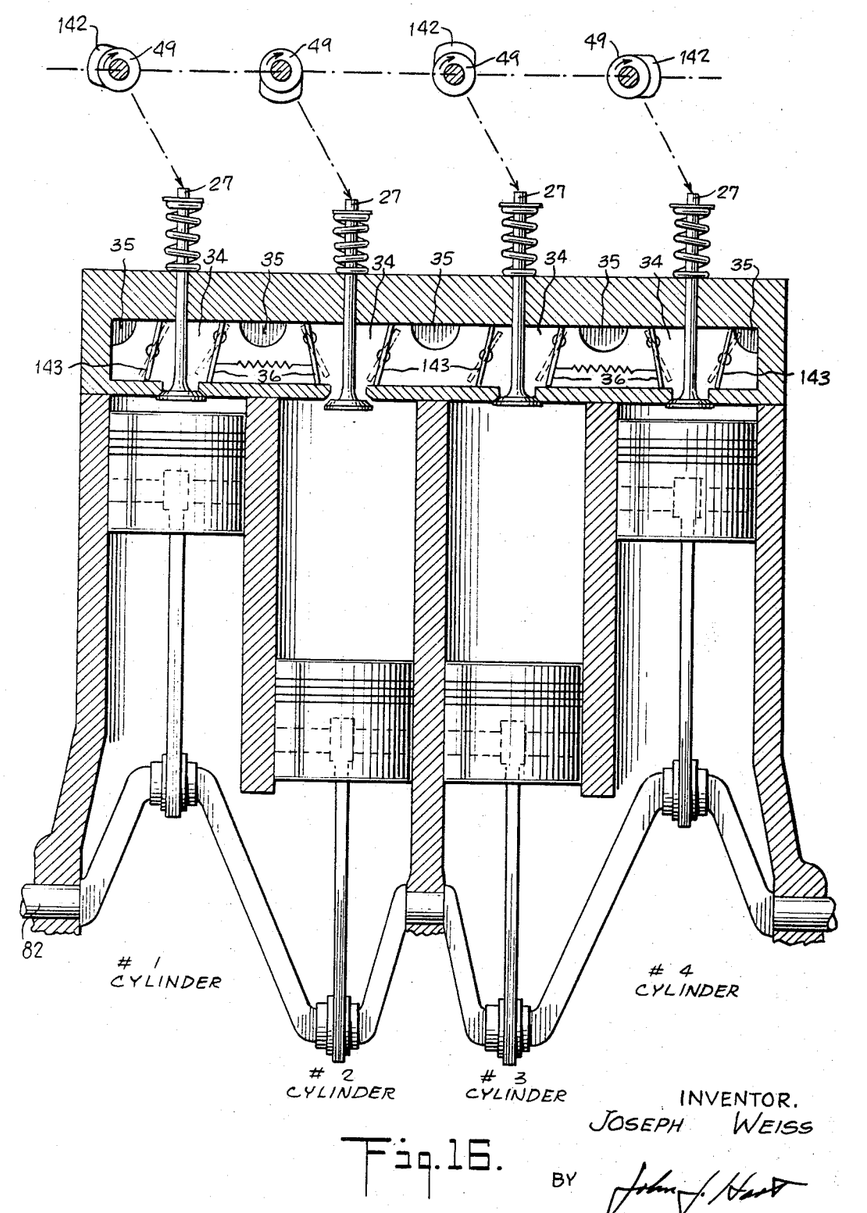
FIG. 16 is a longitudinal sectional view through a four cylinder engine.

FIG. 16 shows another method of proportioning the inducted intake during the compression stroke of the piston, and which is especially suited for a stratified-charge in which high volatile fuel is injected into the inducted air inside the cylinder in a known manner. In the figure is illustrated a four cylinder four cycle engine, the cylinders of which are numbered from the left. 1 through 4. 27 denotes the conventional intake valve, 34 denotes the valve port, 35 the intake manifold, 36 denotes the conventional one way butterfly valve, 82 denotes the crankshaft, 22 the piston, and 143 denotes a conventional throttle butterfly valve. The vacuum operated valve 135 shown in FIG. 14, or that of valve in FIG. 6 can be substituted in place of the valve 36 shown here. During low and idling speeds of the engine, it is desirable to have a compression ratio of 1–1, and that the air in the cylinder be turbulent so that the fuel injected be distributed evenly for most efficient burning of the fuel. In the engine's high speed range a compression ratio of 11–1 is desirable for most efficient engine operation. To achieve these extremes the intake valve cam lobe 142 is designed to maintain valve 27 open approximately 340 degrees travel of revolution of the crankshaft instead of the 220 degrees which is conventional.

Figure 17:
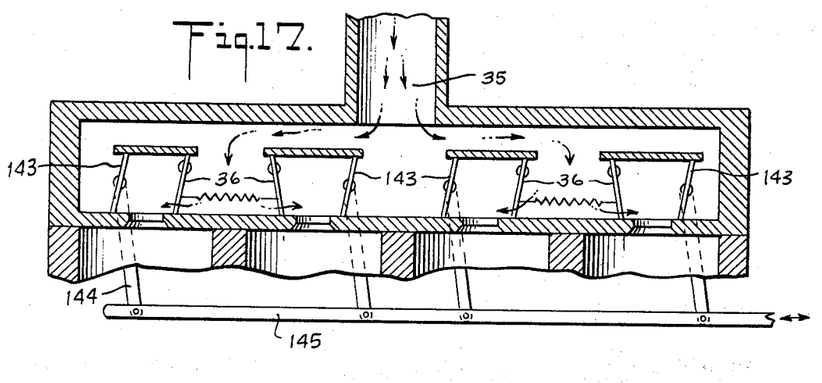
FIG. 17 is a fragmentary view of the top part of the intake manifold.

The operation of the engine shown in FIG. 16 is as follows: Unthrottled intake air is admitted into the cylinder on the piston's intake stroke from manifold 35, past one way valve 36, past open valve 27 and into the cylinder. At the end of the piston's intake stroke, valve 27 is still fully open and the piston starts on its compression stroke. The inducted air in the cylinder is now being forced out of the cylinder by the piston through open valve 27, and past the now open throttle valve 143, as indicated by the dotted lines, to manifold 35. Cam lobe 142 is designed to close valve 27 when the piston has reached a predetermined position in the cylinder which would result in a 1–1 ratio. To obtain the 11–1 ratio, the throttle valve 143, through suitable external control means, such as shown in FIG. 17, is closed, and prevents the emitting of the inducted air in the cylinder. Varying the volume of the inducted air that is to be retained in the cylinder for combustion is accomplished by varying the opening of the throttle valve 143.

FIG. 17 is another view of FIG. 16 showing the intake manifold 35 and its passageways, one way valve 36, and butterfly valve 143 with its actuating lever 144 connected to a rod 145 which may be actuated manually and/or through conventional automatic means, such as the servo mechanism shown in FIGS. 11 and 12 by connecting lever 144 to piston rod 123, or the governor means 110 shown in FIG. 11 to effect direct engine control.

Figure 18:
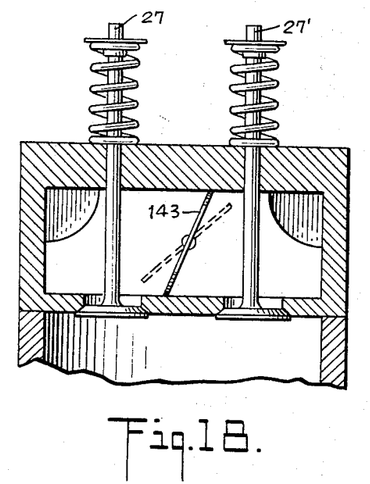
FIG. 18 is a fragmentary view of cylinder head and valves which are another modification of FIG. 16.

FIG. 18 is a modification of FIG. 16 and the valve 27 shown therein operates and functions in the manner shown and described for it in FIG. 16. Intake valve 27' operates in exactly the same manner and sequence as in a conventional engine, i.e., it opens at approximately top dead center on the start of the piston's intake stroke, and closes at approximately 30 degrees after bottom dead center after the piston had completed its intake stroke. In this structure one way valve 36 is not needed and therefore is dispensed with.

Figure 19:
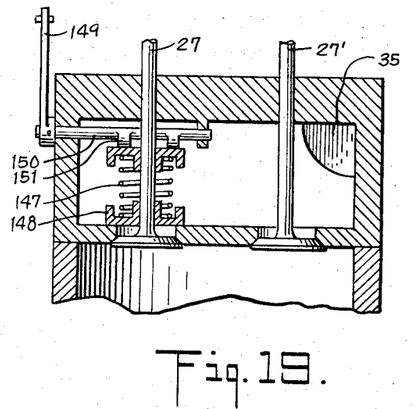
FIG. 19 is a fragmentary view of a cylinder head and valves which are another modification of FIGS. 16 and 18.

FIG. 19 is a modification of FIG. 18, and a still further modification of FIG. 16. In the structure of FIG. 19, both the throttle valve 143 and valve 36 of FIG. 16 are dispensed with. The operation and functions of valve 27 and valve 27' are the same as described for FIG. 18. In this structure the means for varying the volume of air to be retained in the cylinder is by means of a spring actuated disc valve 148 which is normally seated closed by a spring 147, calibrated to permit unseating of the valve disc 148 when the air pressure acting to unseat it exceeds a predetermined amount. When it is desired to increase the volume of air to be retained in the cylinder, the control lever 149 is actuated to rotate shaft 150 to further compress spring 147 through the cam lobes 151 on shaft 150. In FIG. 19, the spring 147 is shown compressed by the cam lobes 151.

While I have illustrated in the drawings and hereinabove described, examples of the manner in which my invention may be practiced, it will be understood by those skilled in the art that many modifications of the disclosed structures may be made without departing from the spirit of the invention or the scope of the appended claims.

I claim:

1. In an internal combustion engine, having a plurality of cylinders and a piston for each of said cylinders, the combination of an intake manifold, a carburetor, said carburetor having no throttle valve, said carburetor providing an unrestricted supply of carbureted mixture to said manifold, first valve means for exhausting fluid from each of said cylinders, first operative means for maintaining said first valve means closed during the intake stroke of the piston in such cylinder, second valve means for controlling the carbureted mixture charge in each of said cylinders, second operative means for operating said second valve means to permit the entry of a carbureted mixture from said manifold thereof into each of said cylinders throughout the entire intake stroke of its associated piston so as to completely fill the cylinder with a carbureted mixture charge from said manifold to avoid the creation of a high partial vacuum at any time during the intake stroke, said second operative means including control means for maintaining the communication of each cylinder through said second valve means open during the initial portion of each compression stroke of its associated piston to permit the exhaust of a portion of the inducted carbureted mixture in such cylinder through said second valve means on each compression stroke of each of said cylinders thereby uninterruptedly reducing the initial charge supplied to such cylinder, said control means being operative to vary the exhaust time period of said second valve means during each of the compression strokes of said cylinders to vary the total compressible inducted charge in each of said cylinders in accordance with operating conditions and thereby the power created therefrom in the compression cycle of said cylinder.

2. In an internal combustion engine having a plurality of cylinders and a piston for each of said cylinders, the combination of gas intake conduit means communicating at its intake end with a source for the continuous supply of air for said cylinders and having no throttle valve restricting such air passing therethrough from such supply source, thereby providing an unrestricted supply of air from such source to said cylinders, means providing a supply of fuel to be mixed with such air, first valve means for exhausting fluid from each of said cylinders, first operative means for maintaing said first valve means closed during the intake stroke of the piston in such cylinder, second valve means for controlling the gas charge in each of said cylinders, second operative means for operating said second valve means to permit the entry of gas from said intake conduit means into each of said cylinders throughout the entire intake stroke of its associated piston so as to completely fill the cylinder with a gas charge such as to avoid the creation of a high partial vacuum at any time during the intake stroke, said second operative means including control means not actuated by supercharging means for maintaining the communication of each cylinder through said second valve means open during the initial portion of each compression stroke of its associated piston to permit the exhaust of a portion of the inducted gas in such cylinder through said second valve means on each compression stroke of each of said cylinders uninterruptedly reducing the initial charge supplied to such cylinder, said control means being operative to vary the exhaust of said second valve means during each of the compression strokes of said cylinders to vary the total compressible inducted charge in each of said cylinders in accordance with operating conditions and thereby the power created therefrom in the compression cycle of said cylinder.

3. An internal combustion engine as defined in claim 2, in which said control means includes time variable means connected to and controlling said second valve means, and means operative to vary said time variable means.

4. An internal combustion engine as defined in claim 2, in which said control means includes a driven cam shaft operatively connected to said second valve means, a driven gear mounted on said cam shaft and a driving gear, and means located between and operatively connecting said driving gear to said driven gear.

5. An internal combustion engine as defined in claim 2 provided with a crankshaft and in which said valve control means comprises a second valve means lifter connected to said valve, a first camshaft connected to and driven by said crankshaft and having a cam operatively associated with said valve lifter, a second camshaft having a cam operatively associated with said cam lifter, and driving means connected to and operable to drive said second camshaft, said driving means being constructed and arranged to cause said second camshaft cam to rotate in synchronism with said first camshaft cam at a given speed of said crankshaft to operate said second valve means at given time intervals, and to rotate said second camshaft cam out of synchronism with said first camshaft first camshaft cam at speeds of said crankshaft varying from said given speed thereof to cause a retardation of the closing of said second valve means corresponding to the variance in such speed.

6. An internal combustion engine as defined in claim 5, in which said second camshaft driving means includes time variable means adjustable to cause said second camshaft cam to be rotated in synchronism with said first camshaft cam at a speed of said crankshaft different from said given speed.

7. An internal combustion engine as defined in claim 4, in which said driven gear is a ring gear arranged concentrically around said driving gear, and in which said means located between said driving and driven gears is composed of at least one idler gear.

8. An internal combustion engine as defined in claim 3, in which said control means comprises driving means connected to said engine and driven means operatively connected to said second valve means, and in which said time variable means is located between said driving and driven means.

9. An internal combustion engine as defined in claim 8, in which said time variable means includes a driving gear connected to said engine, a driven gear connected to said second valve means, and an idler connected to and intermediate said driving and driven gears and movable about the axis of said driving gear, and means for adjusting the position of said idler gear about said driving gear axis to change the synchronized relationship of said driving and driven gears and thereby change the timing of said valve.

10. An internal combustion engine as defined in claim 9, in which said adjusting means comprises a lever connected to said idler gear, and means operable to actuate said lever.

11. An internal combustion engine as defined in claim 10, in which said operable means includes a hydraulic power cylinder connected to and controlling said lever, a fluid valve controlling the fluid to said power cylinder, and means controlled by the speed of the engine for controlling said fluid valve.

12. An internal combustion engine as defined in claim 11 including thermostat means connected to and controlling the operableness of said fluid valve.

13. In an internal combustion engine as defined in claim 2, in which said second valve means for each cylinder includes an intake valve to control the admission of the inducted intake to the combustion chamber thereof, and a relief valve for controlling both the admission of the inducted intake to such combustion chamber and the exhaust of a portion of the inducted intake during the compression stroke of the piston thereof, and in which said second operative means comprises means for controlling the operations of said intake valve and operable to close it after a given constant interval during the intake stroke of the piston, and means for controlling the operations of said relief valve to maintain it open for given variable intervals during the intake and compression strokes of the piston.

References Cited

UNITED STATES PATENTS

| | | | |
|---|---|---|---|
| 1,497,206 | 6/1924 | Booton. | |
| 907,669 | 12/1908 | Worth | 123—105 |
| 928,842 | 7/1909 | Berliner | 123—105 |
| 1,082,004 | 12/1913 | Anthony | 123—75 |
| 1,301,809 | 4/1919 | Bouteille | 123—75 |
| 1,316,977 | 9/1919 | Ricardo | 123—75 |
| 1,358,186 | 11/1920 | Brewer | 123—90 |
| 1,460,405 | 7/1923 | Brewer | 123—90 |
| 1,623,589 | 4/1927 | Granath | 123—182 |
| 1,749,152 | 3/1930 | Muller | 123—182 |
| 2,326,329 | 8/1943 | Camp | 123—105 |
| 2,344,993 | 3/1944 | Lysholm | 123—105 |
| 2,817,322 | 12/1957 | Miller | 123—75 |

FOREIGN PATENTS

| | | |
|---|---|---|
| 543,563 | 3/1942 | Great Britain. |
| 1,261,797 | 4/1961 | France. |

ROBERT A. O'LEARY, *Primary Examiner.*

U.S. Cl. X.R.

123—90, 105, 182